(12) United States Patent
Nishiura et al.

(10) Patent No.: US 7,772,735 B2
(45) Date of Patent: Aug. 10, 2010

(54) EMBEDDED MAGNET TYPE ROTATING ELECTRIC MACHINE

(75) Inventors: Hideaki Nishiura, Kosai (JP); Seiya Yokoyama, Toyohashi (JP); Yoshiaki Takemoto, Kosai (JP)

(73) Assignee: ASMO Co., Ltd., Shizuoka-ken (JP)

( * ) Notice: Subject to any disclaimer, the term of this patent is extended or adjusted under 35 U.S.C. 154(b) by 295 days.

(21) Appl. No.: 11/736,474

(22) Filed: Apr. 17, 2007

(65) Prior Publication Data

US 2007/0252469 A1    Nov. 1, 2007

(30) Foreign Application Priority Data

| Apr. 19, 2006 | (JP) | 2006-115939 |
| Apr. 26, 2006 | (JP) | 2006-122254 |
| Jun. 2, 2006 | (JP) | 2006-154807 |
| Aug. 7, 2006 | (JP) | 2006-214937 |

(51) Int. Cl.
H02K 21/12    (2006.01)

(52) U.S. Cl. .................. 310/156.56; 310/156.57; 310/156.36; 310/166; 310/261.1

(58) Field of Classification Search ............ 310/156.53, 310/156.56, 156.36, 156.57, 166, 261.1; H02K 1/27
See application file for complete search history.

(56) References Cited

U.S. PATENT DOCUMENTS

| 4,939,398 | A | * | 7/1990 | Lloyd ................ | 310/156.53 |
| 6,064,132 | A | * | 5/2000 | Nose ................. | 310/216.102 |
| 6,147,428 | A | * | 11/2000 | Takezawa et al. ...... | 310/156.57 |
| 6,707,206 | B2 | * | 3/2004 | Chang ................ | 310/156.08 |
| 6,911,756 | B1 | * | 6/2005 | Chang ................ | 310/156.01 |
| 7,612,480 | B2 | * | 11/2009 | Fujii et al. ........... | 310/156.53 |
| 2002/0047435 | A1 | * | 4/2002 | Takahashi et al. ...... | 310/156.56 |
| 2002/0145353 | A1 | * | 10/2002 | Kimura et al. ......... | 310/156.57 |
| 2002/0175585 | A1 | * | 11/2002 | Tagome et al. ........ | 310/156.56 |
| 2003/0201685 | A1 | * | 10/2003 | Shimada et al. ....... | 310/156.53 |

FOREIGN PATENT DOCUMENTS

| JP | 4-128056 | 11/1992 |
| JP | 6-245419 | 9/1994 |
| JP | 10-066285 | 3/1998 |
| JP | 2004-173491 | 6/2004 |
| JP | 2004-180460 | 6/2004 |

\* cited by examiner

*Primary Examiner*—Quyen Leung
*Assistant Examiner*—Terrance Kenerly
(74) *Attorney, Agent, or Firm*—Patterson Thuente Christensen Pedersen, P.A.

(57) ABSTRACT

A plurality of magnets are arranged in accommodating holes each extending in a radial direction. A rotor core is provided with an extension portion in a circumferential direction extending further outward in the circumferential direction with respect to the magnet from at least one of a radially outer end and a radially inner end in the accommodating hole, and a radial regulating portion regulating a movement of the magnet in the radial direction. The radial regulating portion extends in the radial direction so as to correspond to a center in the circumferential direction of the accommodating hole. The dimension in the circumferential direction of a portion of the radial regulating portion that is brought into contact with the magnet is smaller than the dimension in the circumferential direction of the magnet. A cross-sectional area of the radial regulating portion as seen from the radial direction is small, in comparison with the case in which the radial regulating portion extends entirely in the axial direction of the rotor core. Accordingly, it is possible to reduce a leakage flux in a rotating electric machine.

19 Claims, 9 Drawing Sheets

EMBEDDED MAGNET TYPE ROTATING ELECTRIC MACHINE

BACKGROUND OF THE INVENTION

The present invention relates to an embedded magnet type rotating electric machine.

A rotor of the embedded magnet type rotating electric machine has a rotor core and a plurality of magnets embedded in the rotor core. The rotor core has a plurality of accommodating holes lined up in a circumferential direction. Each of the accommodating holes passes through the rotor core in an axial direction, and extends in a radial direction. The magnet is arranged in each of the accommodating holes.

Japanese Laid-Open Patent Publication No. 2004-173491 discloses a circumferential extension portion extending further outward in the circumferential direction with respect to an end in the circumferential direction of a magnet from a radially outer end (an outer end in a radial direction) of an accommodating hole. The circumferential extension portion increases a magnetic resistance, thereby reducing a leakage flux directly directed to an S pole of the magnet from an N pole of the magnet.

However, the publication discloses a structure in which the entire surface of a radially outer end and the entire surface of a radially inner end in each of the magnets are brought into contact with a rotor core. Accordingly, a magnetic resistance in the rotor core is still low. As a result, an effective magnetic flux of the rotor with respect to the stator is small, and a motor efficiency is low.

SUMMARY OF THE INVENTION

An objective of the present invention is to provide an embedded magnet type rotating electric machine which can reduce a leakage flux.

In accordance with one aspect of the present invention, there is provided an embedded magnet type rotating electric machine provided with a rotor. The rotor defines an axial direction and a circumferential direction. The rotor is provided with a rotor core having a plurality of accommodating holes lined up in the circumferential direction. Each of the accommodating holes passes through the rotor core in the axial direction. Each of the accommodating holes extends in the radial direction. A plurality of magnets are respectively arranged in the accommodating holes. The rotor core is provided with a circumferential extension portion extending further outward in the circumferential direction with respect to the magnet from at least one of a radially outer end and a radially inner end in the accommodating hole, and a radial regulating portion regulating a movement of the magnet in a radial direction. The radial regulating portion extends in the radial direction in such a manner as to correspond to a center in the circumferential direction of the accommodating hole. The dimension in the circumferential direction of a portion of the radial regulating portion that is brought into contact with the magnet is smaller than the dimension in the circumferential direction of the magnet. In comparison with a case in which the radial regulating portion extends entirely in the axial direction of the rotor core, a cross-sectional area of the radial regulating portion as seen from the radial direction is small.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF PREFERABLE EMBODIMENTS

Figures 1, 1A:
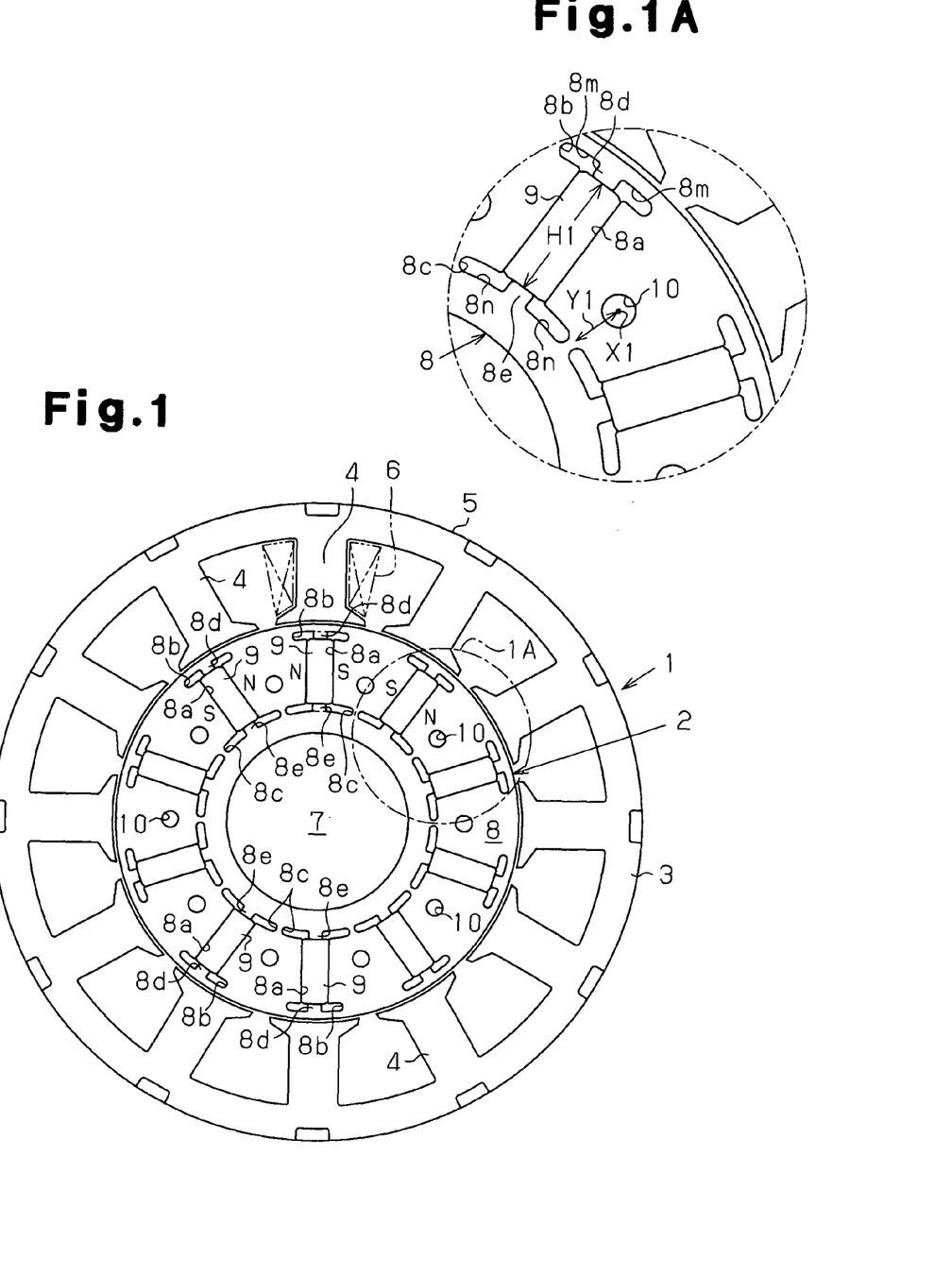
FIG. 1 is a cross-sectional plan view of an embedded magnet type motor according to a first embodiment of the present invention.
FIG. 1A is a partially enlarged view of the rotor shown in FIG. 1.

A description will be given below of a first embodiment of the present invention with reference to FIGS. 1 to 3. As shown in FIG. 1, an embedded magnet type rotating electric machine in accordance with the first embodiment is an inner rotor type embedded magnet type motor. In other words, the motor is provided with a cylindrical stator 1, and a rotor 2 arranged rotatably in an inner portion of the stator 1.

The stator 1 has a stator core 5 and a plurality of coils 6. FIG. 1 shows one coil 6 by a two-dot chain line. The stator core 5 has a cylinder portion 3 constructing an outer shape of the stator 1, and a plurality of teeth 4 extending toward a center axis from an inner circumferential surface of the cylinder portion 3. A plurality of teeth 4 are arranged at an equal angular interval in a circumferential direction. Each of the coils 6 is wound around the corresponding tooth 4 via an insulator (not shown) by means of a concentrated winding. In the present embodiment, the number of the teeth 4 is twelve.

As shown in FIG. 1, the rotor 2 is provided with a rotary shaft 7, a rotor core 8 fixed to the rotary shaft 7, and a plurality of magnets 9 embedded in the rotor core 8. The rotor core 8 has a plurality of accommodating holes 8a. One magnet 9 is arranged (accommodated) in one accommodating hole 8a.

Describing in detail, the cylindrical rotor core 8 has a center hole to which the rotary shaft 7 is press fitted. The rotor core 8 in accordance with the present embodiment has ten accommodating holes 8a at an equal angular interval in the circumferential direction. Each of the accommodating holes 8a passes through the rotor core 8 in the axial direction. As shown in FIG. 1, each of the accommodating holes 8a extends in the radial direction. Each of the magnets 9 is formed in a rectangular parallelepiped shape. Each of the magnets 9 is magnetized in a short length direction as seen from the axial direction. In a state in which each of the magnets 9 is arranged in the accommodating hole 8a, a first end in the circumferential direction of each of the magnets 9 is one of the N pole and the S pole, and a second end in the circumferential direction is the other pole. A pair of magnets 9 which are adjacent in the circumferential direction are arranged in such a manner that the same poles face each other. As a result, ten magnets 9 construct five N magnetic poles and five S magnetic poles.

The rotor core 8 has a plurality of first radial regulating portions 8d regulating a radially outward movement of each of the magnets 9 (further outward in the radial direction), and a plurality of second radial regulating portions 8e regulating a radially inward movement of each of the magnets 9. Each of the radial regulating portions 8d and 8e extends in the radial direction, and corresponds to a center in the circumferential direction of each of the accommodating holes 8a. The dimension in the circumferential direction, that is, the width, of each of the radial regulating portions 8d and 8e is constant over the radial direction. The dimension in the circumferential direction of each of the radial regulating portions 8d and 8e is smaller than the dimension in the circumferential direction of the magnet 9, that is, the dimension in a short length direction of the magnet 9. In other words, each of the first radial regulating portions 8d is brought into contact with a radially outer end of the magnet 9 at a smaller dimension than the dimension in the circumferential direction of the outer end. In the same manner, each of the second radial regulating portions 8e is brought into contact with a radially inner end of the magnet 9 at a smaller dimension than the dimension in the circumferential direction of the inner end.

Figure 2A:
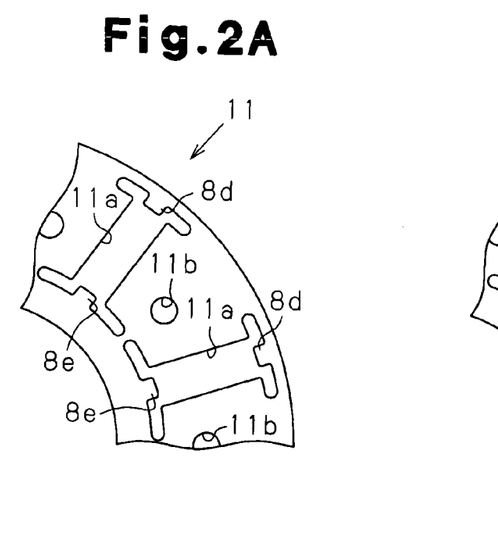
FIG. 2A is a partially plan view of a regulating core sheet shown in FIG. 3.
Figure 2B:
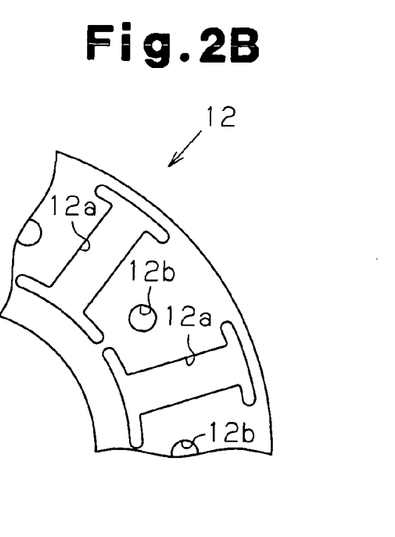
FIG. 2B is a partially plan view of a non-regulating core sheet shown in FIG. 3.

FIG. 2A shows a regulating core sheet 11, and FIG. 2B shows a non-regulating core sheet 12. As shown in FIG. 3, a plurality of regulating core sheets 11 and a plurality of non-regulating core sheets 12 are laminated in the axial direction, whereby the rotor core 8 is formed. In the present embodiment, the regulating core sheets 11 and the non-regulating core sheets are laminated alternately one by one. The number of the regulating core sheets 11 and the number of the non-regulating core sheets 12 are determined in correspondence to the dimension in the axial direction of the rotor 2, that is, in correspondence to the size of the motor.

As shown in FIG. 2A, the regulating core sheet 11 has radial regulating portions 8d and 8e. The non-regulating core sheet 12 has a shape obtained by deleting the radial regulating portions 8d and 8e from the regulating core sheet 11. In other words, the non-regulating core sheet 12 does not have the radial regulating portions 8d and 8e, but has spaces at positions corresponding to the radial regulating portions 8d and 8e. In each of the accommodating holes 8a of the rotor core 8, a plurality of first radial regulating portions 8d are lined up in the axial direction. A plurality of second radial regulating portions 8e are lined up in the axial direction. Accordingly, for example, in comparison with the case in which each of the radial regulating portions 8d and 8e extends entirely in the axial direction of the rotor core 8, a cross-sectional area of each of the radial regulating portions 8d and 8e as seen from the radial direction is small.

As shown in FIG. 1A, the rotor core 8 has a pair of first extension spaces 8m holding the first radial regulating portion 8d therebetween, in the radially outer end in each of the accommodating holes 8a. A pair of first extension spaces 8m slightly protrude radially outward from both ends in the circumferential direction of the accommodating hole 8a, and thereafter extend in opposite directions with respect to the circumferential direction. In other words, a pair of first extension spaces 8m in each of the accommodating holes 8a extends further outward in the circumferential direction with respect to the magnet 9. Each of the first extension spaces 8m is positioned radially outward of the magnet 9. The radial dimension of each of the first extension spaces 8m is constant. In other words, the width corresponding to the dimension which is vertical to an extending direction of each of the first extension spaces 8m is constant.

In the same manner, the rotor core 8 has a pair of second extension spaces 8n holding the second radial regulating portion 8e therebetween, in a radially inner end in each of the accommodating holes 8a. A pair of second extension spaces 8n slightly protrude radially inward from both ends in the circumferential direction of the accommodating hole 8a, and thereafter extend in opposite directions to each other with respect to the circumferential direction. In other words, a pair of second extension spaces 8n in each of the accommodating holes 8a extend further outward in the circumferential direction with respect to the magnet 9. Each of the second extension spaces 8n is positioned radially inward of the magnet 9. The radial dimension, that is, the width of each of the second extension spaces 8n is constant.

As shown in FIG. 1A, a pair of first extension spaces 8m in each of the accommodating holes 8a form one first circumferential extension portion 8b. In other words, the rotor core 8 has ten first circumferential extension portions 8b each extending in the circumferential direction in the radially outer end of the accommodating hole 8a. The dimension in the circumferential direction of each of the first circumferential extension portions 8b is larger than the dimension in the circumferential direction of the accommodating hole 8a. In other words, each of the first circumferential extension portions 8b extends further outward in the circumferential direction than the end in the circumferential direction of the magnet 9.

In the same manner, a pair of second extension spaces 8n in each of the accommodating holes 8a form one second circumferential extension portion 8c. In other words, the rotor core 8 has ten second circumferential extension portions 8c each extending in the circumferential direction in the radially inner end of the accommodating hole 8a. The dimension in the circumferential direction of each of the second circumferential extension portions 8c is larger than the dimension in the circumferential direction of the accommodating hole 8a. In other words, each of the second circumferential extension portions 8c extends further outward in the circumferential direction than the end in the circumferential direction of the magnet 9.

In the present embodiment, the radial dimension of each of the first radial regulating portions 8d, that is, a protruding amount of the first radial regulating portion 8d is set equal to the radial dimension of the first circumferential extension portion 8b. In the same manner, the radial dimension of each of the second radial regulating portions 8e, that is, a protruding amount of the second radial regulating portion 8e is set equal to the radial dimension of the second circumferential extension portion 8c.

The regulating core sheet 11 has a plurality of pre-lamination accommodating holes 11a, and the non-regulating core sheet 12 has a plurality of pre-lamination accommodating holes 12a. In the present embodiment, the number of the pre-lamination accommodating holes 11a in the regulating core sheet 11 is ten which is equal to the number of the accommodating holes 8a in the rotor core 8. The number of the pre-lamination accommodating holes 12a in the non-regulating core sheet 12 is ten, which is equal to the number of the accommodating holes 8a in the rotor core 8. A plurality of pre-lamination accommodating holes 11a and 12a aligned in the axial direction form one accommodating hole 8a.

Figure 4:
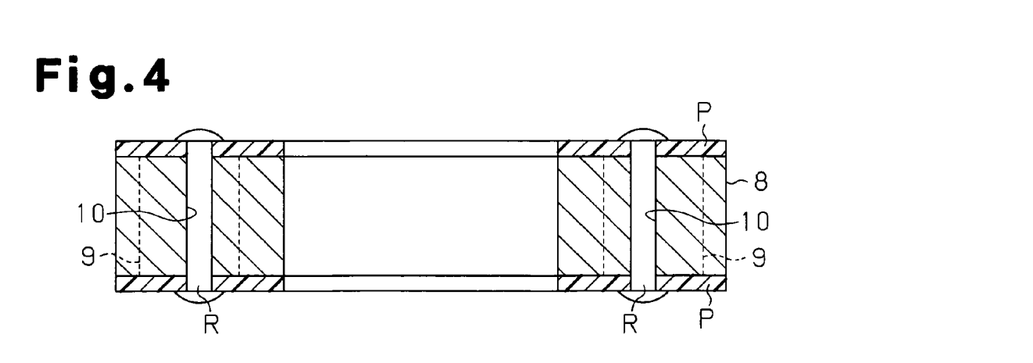
FIG. 4 is a cross-sectional view of the rotor shown in FIG. 1.

Each of the regulating core sheets 11 has a plurality of pre-lamination fastening holes 11b. Each of the non-regulating core sheets 12 has a plurality of pre-lamination fastening holes 12b. A plurality of pre-lamination fastening holes 11b and 12b aligned in the axial direction form the fastening holes 10. In the rotor core 8, the accommodating holes 8a and the fastening holes 10 are lined up alternately one by one at a uniform interval in the circumferential direction. As shown in FIG. 4, a rivet R serving as a fastening member is inserted to the fastening hole 10. A plurality of rivets R fasten a plurality of regulating core sheets 11 and a plurality of non-regulating core sheets 12, which are laminated.

As shown in FIG. 4, a pair of discs P for regulating a movement in the axial direction of the magnet 9 are arranged in both ends in the axial direction of the rotor core 8. Since the rivets R fasten the discs P, the magnet 9 is prevented from coming off the accommodating hole 8a. The disc P has the similar holes to the pre-lamination fastening holes 11b and 12b, but does not have the similar holes to the pre-lamination accommodating holes 11a and 12a. In FIG. 4, the boundary line between the regulating core sheet 11 and the non-regulating core sheet 12 is omitted.

As shown in FIG. 1A, a center position X1 of the fastening hole 10 as seen from the axial direction is displaced radially outward from the radially inner end of the magnet 9 by 40% of the radial dimension H1 of the magnet 9. FIG. 1A shows the radial distance Y1 from the radially inner end of the magnet 9 to the center position X1 of the fastening hole 10. The radial distance Y1 is set to 40% of the radial dimension H1 of the magnet 9. The radial dimension H1 shows a radial range of the accommodating hole 8a in which the magnet 9 is arranged.

Figure 5:
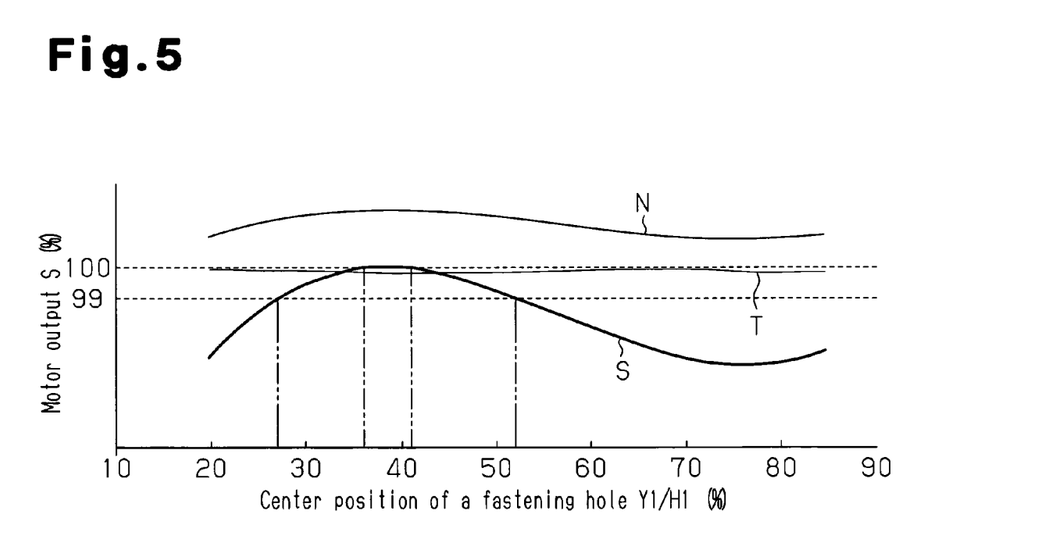
FIG. 5 is a characteristic view showing a relation between a center position of a fastening hole shown in FIG. 1 and a motor output.

The center position X1 of the fastening hole 10 is set on the basis of experimental results shown in FIG. 5. The vertical axis in FIG. 5 indicates a rotating speed N of the motor, a torque T of the motor, and an output S of the motor. 99% and 100% on the vertical axis of FIG. 5 only show the output S. The horizontal axis in FIG. 5 indicates the center position X1.

As shown in FIG. 5, in the case that a ratio Y1/H1 of the radial distance Y1 with respect to the radial dimension H1 of the magnet 9 is equal to or more than 27% and equal to or less than 52%, the output S indicates 99% or more of the maximum value. In other words, the output S is a value close to the maximum value, a flow of a magnetic flux is favorable, the torque T is substantially maximum, and the rotating speed N indicates a value close to the maximum value. In the case that the ratio Y1/H1 is equal to or more than 36% and equal to or less than 41%, the output S indicates substantially 100%. In other words, the output S is substantially the maximum value, the flow of the magnetic flux is better, the torque T is substantially maximum, and the rotating speed N is substantially the maximum value. Accordingly, the ratio Y1/H1 in the present embodiment is set to 40% in the range which is equal to or more than 36% and equal to or less than 41%.

The first embodiment mentioned above has the following advantages.

(1) The rotor core 8 has the first circumferential extension portion 8b positioned in the radially outer end of each of the accommodating holes 8a, and the second circumferential extension portion 8c positioned in the radially inner end of each of the accommodating holes 8a. The dimension in the circumferential direction of each of the circumferential extension portions 8b and 8c is larger than the dimension in the circumferential direction of each of the magnets 9. Each of the circumferential extension portions 8b and 8c extends outward in the circumferential direction with respect to each of the magnets 9. Accordingly, a magnetic resistance of the rotor core 8 is increased. It is possible to reduce a leakage flux directly directed to the S pole of the magnet 9 from the N pole of the magnet 9.

The rotor core 8 has a plurality of first radial regulating portions 8d respectively brought into contact with the radially outer ends of the magnets 9 at the smaller dimension than the dimension in the circumferential direction of the radially outer end, and a plurality of second radial regulating portions 8e respectively brought into contact with the radially inner ends of the magnets 9 at the smaller dimension than the dimension in the circumferential direction of the radially inner end. Accordingly, in comparison with the case in which the radial regulating portion is brought into contact in the entire circumference with the radially outer end or the radially inner end of the magnet 9, a magnetic resistance of the rotor core 8 is increased. Accordingly, the leakage flux can be further reduced.

For example, in comparison with the case in which each of the radial regulating portions 8d and 8e extends entirely in the axial direction of the rotor core 8, a cross-sectional area of each of the radial regulating portions 8d and 8e as seen from the radial direction is small. Accordingly, the magnetic resistance of the rotor core 8 is further increased. Therefore, the leakage flux can be further reduced. As a result of them, an effective magnetic flux of the rotor 2 with respect to the stator 1 is increased, and a high motor efficiency can be obtained.

(2) The rotor core 8 is formed by laminating a plurality of regulating core sheets 11 having the radial regulating portions 8d and 8e, and a plurality of non-regulating core sheets 12 having no radial regulating portions 8d and 8e in the axial direction. Accordingly, it is easy to form the radial regulating portions 8d and 8e in which the cross-sectional area as seen from the radial direction is small.

(3) The rotor core 8 is formed by alternately laminating a plurality of regulating core sheets 11 and a plurality of non-regulating core sheets one by one. Accordingly, the first radial regulating portions 8d are lined up at the uniform interval in the axial direction. The second radial regulating portions 8e are also lined up at the uniform interval in the axial direction. Accordingly, it is possible to regulate the radial movement of the magnet 9 with a favorable balance. In other words, it is possible to prevent the magnet 9 from being inclined with respect to the rotor core 8.

(4) The ratio Y1/H1 of the radial distance Y1 from the radially inner end of the magnet 9 to the center position X1 of the fastening hole 10 with respect to the radial dimension H1 of the magnet 9 is set equal to or more than 36% and equal to or less than 41%. Accordingly, the flow of the magnetic flux in the rotor core 8 is favorable. As shown in FIG. 5, it is possible to set the output S of the motor to substantially the maximum value, that is, substantially 100%.

The first embodiment mentioned above may be modified as follows.

The regulating core sheets 11 and the non-regulating core sheets are not limited to be laminated alternately one by one, but may be laminated alternately plural by plural. Further, the ratio between the number of the regulating core sheets 11 and the number of the non-regulating core sheets 12 may be differentiated. In the case that the embedded magnet type motor is specified for a high speed rotation, the regulating core sheets 11 and the non-regulating core sheets 12 are laminated at a rate of one non-regulating core sheet 12 with respect to two regulating core sheets 11, for resisting a centrifugal force. In this case, it is possible to improve the strength of the radial regulating portions 8d and 8e.

For example, in comparison with the case in which each of the radial regulating portions 8d and 8e extends entirely in the axial direction of the rotor core 8, it is possible to employ core sheets other than the regulating core sheets 11 and the non-regulating core sheets, as far as the cross-sectional area of the radial regulating portions 8d and 8e as seen from the radial direction can be set small.

Figure 6:
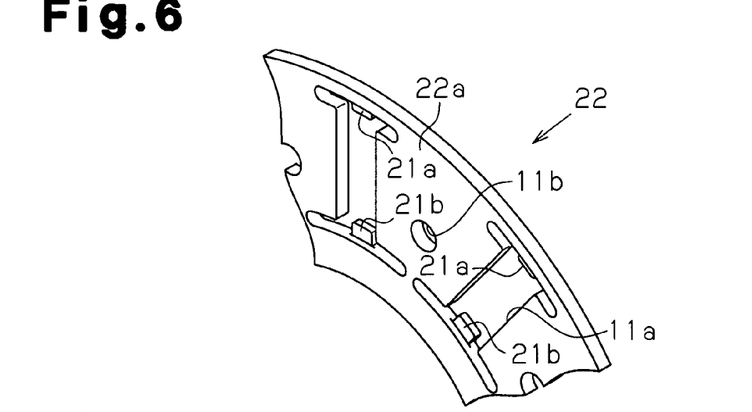
FIG. 6 is a partially perspective view of a thin regulating core sheet in a modification of the present invention.
Figure 7:
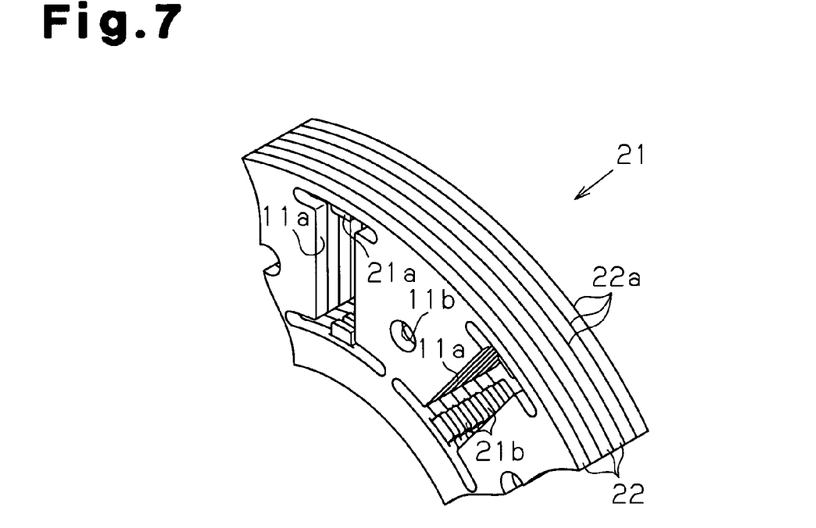
FIG. 7 is a partially perspective view of a rotor core in another modification.

The rotor core 21 may be formed by laminating a thin regulating core sheet 22 shown in FIG. 6 as shown in FIG. 7. The thin regulating core sheet 22 has a first radial regulating portion 21a which is thinner than a sheet main body 22a of the thin regulating core sheet 22, and a second radial regulating portion 21b which is thinner in the same manner. The radial regulating portions 21a and 21b protrude from the sheet main body 22a. The thicknesses of the radial regulating portions 21a and 21b are set half of the thickness of the sheet main body 22a. The rotor core 21 is formed by laminating only a plurality of thin regulating core sheets 22.

In the case of FIGS. 6 and 7, for example, in comparison with the case in which each of the radial regulating portions 21a and 21b extends entirely in the axial direction, it is possible to easily form the radial regulating portions 21a and 21b each having a small cross-sectional area as seen from the radial direction. In the case of forming the radial regulating portions 21a and 21b by means of the press molding, it is possible to easily obtain the thin regulating core sheet 22 while applying a compression stress to the radial regulating portions 21a and 21b.

Figure 8A:
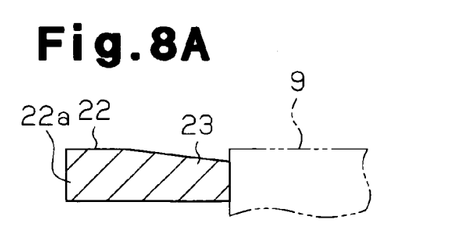
FIGS. 8A to 8C are cross-sectional views of radial regulating portions according to different modifications.
Figure 8B:
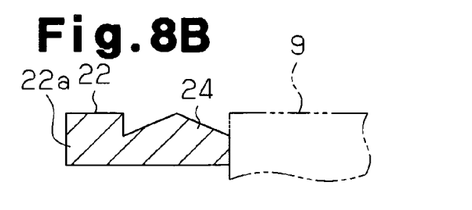
Figure 8C:
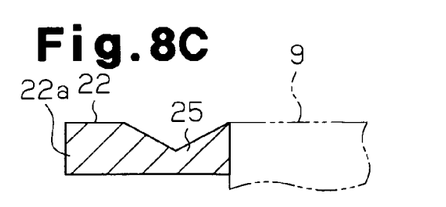

As shown in FIGS. 6 and 7, the entirety of each of the radial regulating portions 21a and 21b is set to a half thickness of the sheet main body 22a. The structure is not limited to this, but may be made such that at least a part of the radial regulating portions 21a and 21b is made thinner than the sheet main body 22a. FIGS. 8A to 8C show one thin regulating core sheet 22. A radial regulating portion 23 shown in FIG. 8A has a thickness which becomes thinner in accordance with approaching the magnet 9. A radial regulating portion 24 shown in FIG. 8B has a cross section which is thin in a potion brought into contact with the sheet main body 22a, and a portion that is brought into contact with the magnet 9, and protrudes in a radial intermediate portion. A radial regulating portion 25 shown in FIG. 8C has a cross section which is recessed in the radial intermediate portion.

The rotor core 8 may be formed by laminating an outer regulating core sheet having only the first radial regulating portion 8d, and an inner regulating core sheet having only the second radial regulating portion 8e. The outer regulating core sheet has a shape obtained by deleting the second radial regulating portion 8e from the regulating core sheet 11. The inner regulating core sheet has a shape obtained by deleting the first radial regulating portion 8d from the regulating core sheet 11. In this case, it is also possible to easily form the radial regulating portions 8d and 8e having the small cross-sectional area as seen from the radial direction. The outer regulating core sheets and the inner regulating core sheets may be laminated alternately one by one or may be laminated alternately plural by plural.

In each of the accommodating holes 8a in the rotor core, a plurality of partly regulating core sheets may be laminated in such a manner that the radial regulating portions 8d and 8e are arranged in a part in the axial direction. The partly regulating core sheet serving as a partly regulating core sheet in the circumferential direction has the radial regulating portions 8d and 8e at least in one of a plurality of pre-lamination accommodating holes 11a. In other words, the partly regulating core sheet does not have the radial regulating portions 8d and 8e in at least one pre-lamination accommodating hole 11a. The partly regulating core sheet is formed in such a shape that the radial regulating portions 8d and 8e are formed alternately in the pre-lamination accommodating holes 11a lined up in the circumferential direction. In this case, it is possible to easily form the radial regulating portions 8d and 8e having the small cross-sectional area as seen from the radial direction. It is preferable to form the rotor core 8 by laminating a plurality of partly regulating core sheets in a state of shifting one by one or plural by plural in the circumferential direction. A plurality of partly regulating core sheets are shifted in the circumferential direction, for example, per an interval of the pre-lamination accommodating holes 11a. In this case, it is possible to form the radial regulating portions 8d and 8e at the uniform interval in the axial direction. In other words, the radial regulating portions 8d and 8e can be brought into contact with a magnet 34 at the uniform interval. Accordingly, it is possible to regulate the radial movement of the magnet 34 with a favorable balance.

The rotor core 8 may be formed by combining and laminating the regulating core sheet 11, the non-regulating core sheet 12, the thin regulating core sheet 22, the outer regulating core sheet, the inner regulating core sheet, and the partly regulating core sheet.

Next, a description will be given of a second embodiment of the present invention with reference to FIG. 9. Different features from the first embodiment will be described in detail.

Figures 9, 9A:
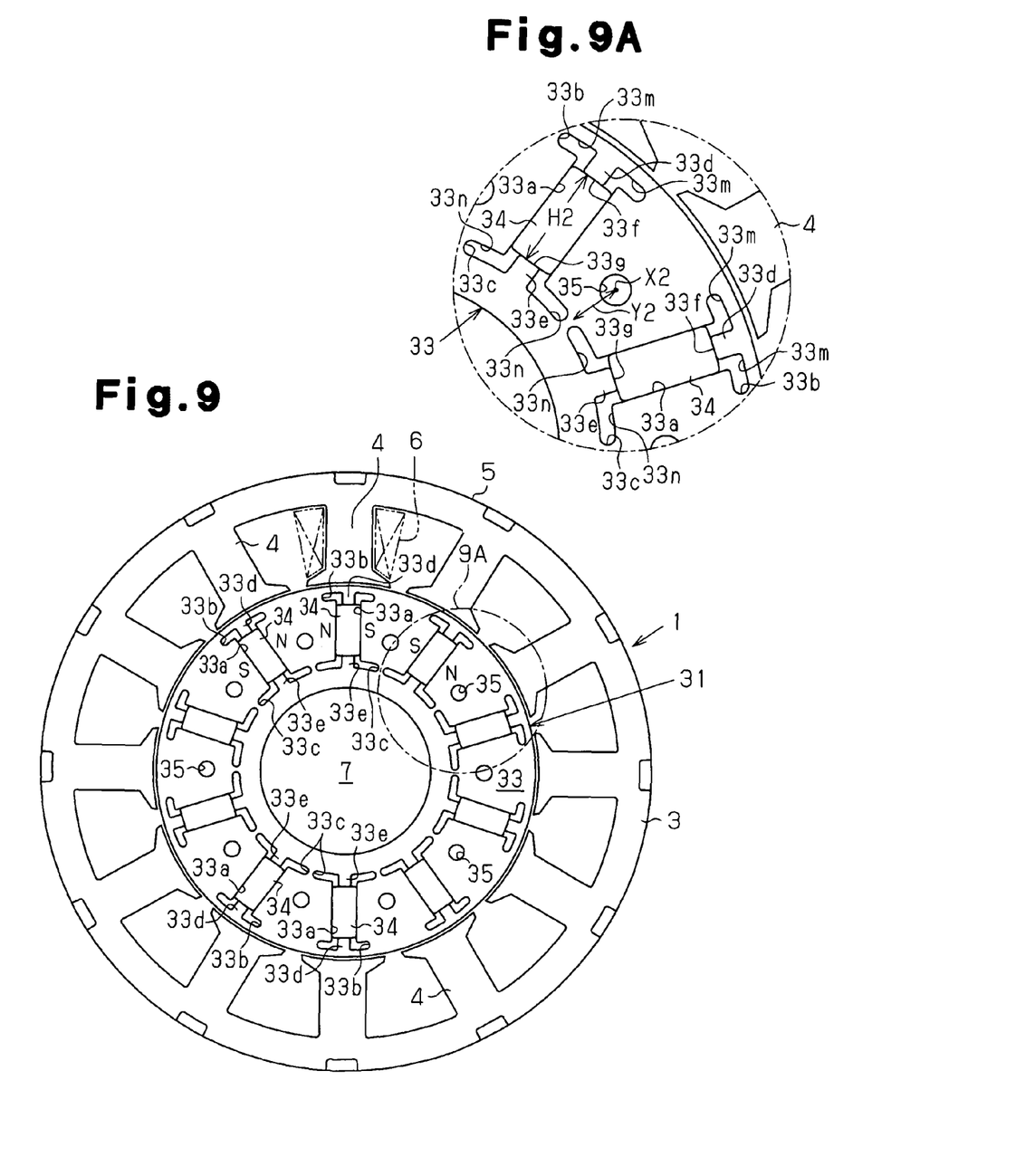
FIG. 9 is a plan cross-sectional view of a motor in a second embodiment of the present invention.
FIG. 9A is a partially enlarged view of the rotor in FIG. 9.

As shown in FIG. 9, a rotor core 33 in a rotor 31 in accordance with a second embodiment has a first radial regulating portion 33d which is brought into contact with a radially outer end of each of magnets 34, and a second radial regulating portion 33e which is brought into contact with a radially inner end of each of the magnets 34. The radial dimension of the first radial regulating portion 33d is larger than a radial dimension of a first circumferential extension portion 33b. The radial dimension of the second radial regulating portion 33e is larger than the radial dimension of a second circumferential extension portion 33c.

In the second embodiment, each of the radial regulating portions 33d and 33e is formed in such a manner as to extend entirely in the axial direction of the rotor core 33.

As shown in FIG. 9A, the rotor core 33 has a pair of first extension spaces 33m holding the first radial regulating portion 33d therebetween, in a radially outer end in each of accommodating holes 33a. A pair of first extension spaces 33m slightly protrude radially outward from both ends in the circumferential direction of the accommodating hole 33a, are thereafter bent vertically, and extend in the circumferential direction. Each of the first extension spaces 33m is positioned radially outward of the magnet 34. As mentioned above, a pair of first extension spaces 33m protrude further radially outward than the first extension spaces 8m in FIG. 1A from the radially outer end of the magnet 34, and thereafter extend in the circumferential direction in such a manner as to extend in opposite directions.

In the same manner, the rotor core 33 has a pair of second extension spaces 33n holding the second radial regulating portion 33e therebetween, in a radially inner end in each of accommodating holes 33a. A pair of second extension spaces 33n slightly protrude radially inward from both ends in the circumferential direction of the accommodating hole 33a, are thereafter bent vertically, and extend in the circumferential direction. Each of the second extension spaces 33n is positioned radially inward of the magnet 34. As mentioned above, a pair of second extension spaces 33n protrude further radially inward than the second extension spaces 8n in FIG. 1A from the radially inner end of the magnet 34, and thereafter extend in the circumferential direction in such a manner as to extend in opposite directions.

As shown in FIG. 9A, the portion extending in the circumferential direction in a pair of first extension spaces 33m in each of the accommodating holes 33a forms one first circumferential extension portion 33b. In other words, the rotor core 33 has ten first circumferential extension portions 33b each extending in the circumferential direction in the radially outer end of the accommodating hole 33a. The dimension in the circumferential direction of each of the first circumferential extension portions 33b is larger than the dimension in the circumferential direction of the accommodating hole 33a. In other words, each of the first circumferential extension portions 33b extends further outward in the circumferential direction than the magnet 34.

In the same manner, the portion extending in the circumferential direction in a pair of second extension spaces 33n in each of the accommodating holes 33a forms one second circumferential extension portion 33c. In other words, the rotor core 33 has ten second circumferential extension portions 33c each extending in the circumferential direction in the radially inner end of the accommodating hole 33a. The dimension in the circumferential direction of each of the second circumferential extension portions 33c is larger than the dimension in the circumferential direction of the accommodating hole 33a. In other words, each of the second circumferential extension portions 33c extends further outward in the circumferential direction than the magnet 34.

The dimension in the circumferential direction, that is, the width of each of the radial regulating portions 33d and 33e, is constant over the radial direction. The dimension in the circumferential direction of each of the radial regulating portions 33d and 33e is smaller than the dimension in the circumferential direction of the magnet 34. In other words, distal ends 33f and 33g of the respective radial regulating portions 33d and 33e are brought into contact with the magnet 34 at a smaller dimension than the dimension in the circumferential direction of the magnet 34. The dimension in the circumferential direction of the distal end 33f of the first radial regulating portion 33d is set equal to the dimension in the circumferential direction of the distal end 33g of the second radial regulating portion 33e.

In the same manner as the first embodiment mentioned above, a center position X2 of a fastening hole 35 in the second embodiment as seen from the axial direction is displaced radially outward from the radially inner end of the magnet 34 by 40% of the radial dimension H2 of the magnet 34. In other words, a ration Y2/H2 of the radial distance Y2 from the radially inner end of the magnet 34 to the center position X2 of the fastening hole 35 with respect to the radial dimension H2 of the magnet 34 is set to 40%.

The second embodiment mentioned above has the following advantages.

(5) The rotor core 33 has the first circumferential extension portion 33b positioned in the radially outer end of each of the accommodating holes 33a, and the second circumferential extension portion 33c positioned in the radially inner end of each of the accommodating holes 33a. The dimension in the circumferential direction of each of the circumferential extension portions 33b and 33c is larger than the dimension in the circumferential direction of each of the magnets 34. Each of the circumferential extension portions 33b and 33c extends outward in the circumferential direction with respect to each of the magnets 34. Accordingly, a magnetic resistance of the rotor core 33 is increased. It is possible to reduce a leakage flux directly directed to the S pole of the magnet 34 from the N pole of the magnet 34.

The radial dimension of the first radial regulating portion 33d is larger than the radial dimension of the first circumferential extension portion 33b. The radial dimension of the second radial regulating portion 33e is larger than the radial dimension of the second circumferential extension portion 33c. Accordingly, the magnetic resistance of the rotor core 33 is further increased. Therefore, the leakage flux is further reduced.

(6) The center position X2 of the fastening hole 35 is set in such that the center position X2 is displaced radially outward from the radially inner end of the magnet 34 by an amount that is in the range between 36% and 41%, inclusive, of the radial dimension H2 of the magnet 34. Accordingly, the flow of the magnetic flux of the rotor core 33 is favorable, and it is possible to set the output S to substantially the maximum value, that is, substantially 100% as shown in FIG. 5.

The second embodiment mentioned above may be modified as follows.

In the second embodiment, the dimension in the circumferential direction of each of the radial regulating portions 33d and 33e is not limited to be fixed over the radial direction. The dimension in the circumferential direction of at least one radial regulating portions 33d and 33e may be formed so as to be different in correspondence to the position in the radial direction. For example, the dimension in the circumferential direction of at least one distal ends 33f and 33g is formed smaller than the dimension in the circumferential direction of proximal ends of the radial regulating portions 33d and 33e. In this case, it is possible to further increase the magnetic resistance of the rotor core 33 while suppressing a reduction of rigidity in the radial regulating portions 33d and 33e. In other words, it is possible to further reduce the leakage flux in the rotor core 33 while suppressing a deformation of the radial regulating portions 33d and 33e. FIGS. 10A to 13 show these examples.

Figure 10A:
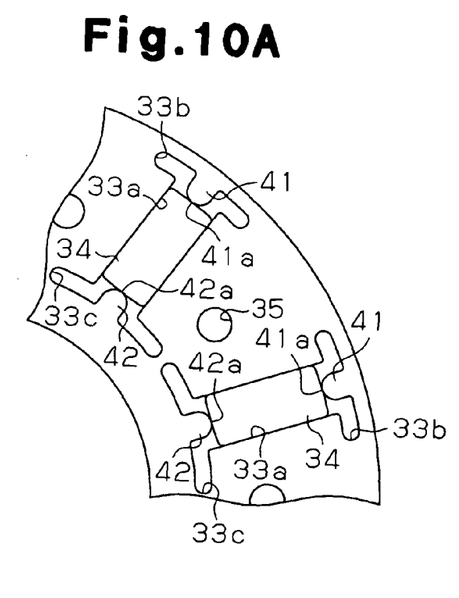
FIGS. 10A and 10B are partially enlarged plan views of a rotor in another modification.

As shown in FIG. 10A, each of first radial regulating portions 41 has a distal end 41a which is brought into contact with the magnet 34. Each of second radial regulating portions 42 has a distal end 42a which is brought into contact with the magnet 34. The distal ends 41a and 42a have a semicircular shape (a curved shape) as seen from the axial direction. As a result, the dimension in the circumferential direction of each of the distal ends 41a and 42a which are brought into contact with the magnet 34 is smaller than the dimension in the circumferential direction of the proximal end of each of the radial regulating portions 41 and 42. In a cross section which is vertical to the axial direction, the distal ends 41a and 42a have a curved shape which is in point contact with the magnet 34. Each of the distal ends 41a and 42a is brought into contact with the magnet 34 in a line extending in the axial direction.

Figure 10B:
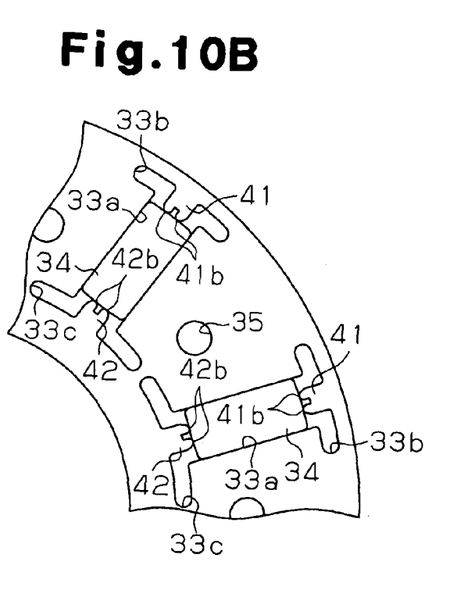

Distal ends 41b and 42b of the radial regulating portions 41 and 42 shown in FIG. 10B are formed in a curved shape having two semicircles in such a manner as to be in point contact with the magnet 34 at two points in the vertical cross section to the axial direction. In other words, each of the distal ends 41b and 42b has a recesses. In this case, the dimension in the circumferential direction of the distal ends 41b and 42b each being brought into contact with the magnet 34 is smaller than the dimension in the circumferential direction of the proximal ends of the radial regulating portions 41 and 42. As a result, the radial regulating portions 41 and 42 tend to stably support the magnet 34 while reducing the leakage flux.

Further, the distal ends 41b and 42b of the radial regulating portions 41 and 42 may be formed in such a manner as to be in point contact with the magnet 34 at three or more points.

Figure 11:
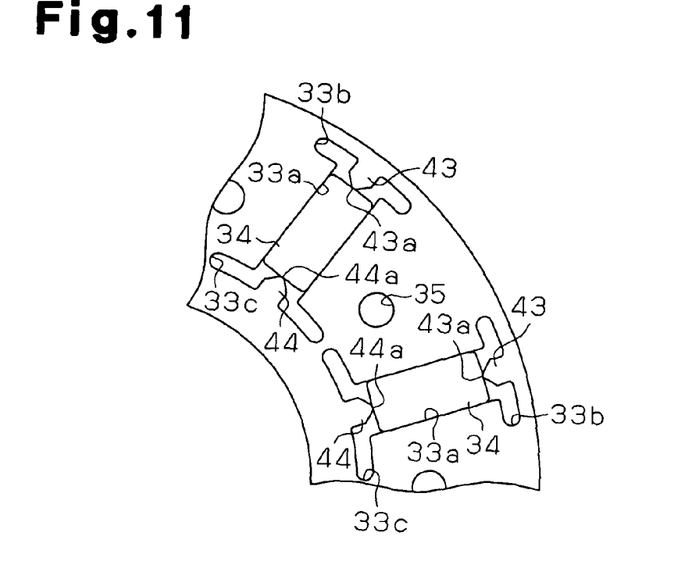
FIG. 11 is a partially enlarged plan view of a rotor in another modification.

Radial regulating portions 43 and 44 shown in FIG. 11 have distal ends 43a and 44a which are formed in a triangular shape in a vertical cross section to the axial direction. The dimension in the circumferential direction of the distal ends 43a and 44a becomes smaller in accordance with approaching the magnet 34.

Figure 12:
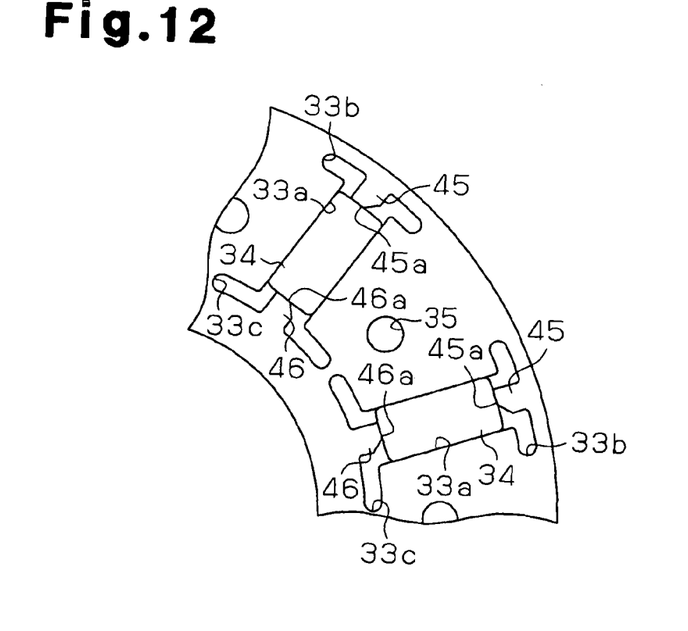
FIG. 12 is a partially enlarged plan view of a rotor in another modification.

Radial regulating portions 45 and 46 shown in FIG. 12 have distal ends 45a and 46a which are formed substantially in a trapezoidal shape obtained by chamfering one side with respect to the circumferential direction. Both of the distal end 45a of the first radial regulating portion 45 and the distal end 46a of the second radial regulating portion 46 are formed by chamfering a side surface in a clockwise direction in FIG. 12. The dimension in the circumferential direction of each of the distal ends 45a and 46a becomes smaller in accordance with approaching the magnet 34. In other words, the dimension in the circumferential direction of each of the distal ends 45a and 46a is smaller than the dimension in the circumferential direction of the proximal ends of the radial regulating portions 45 and 46.

Figure 13:
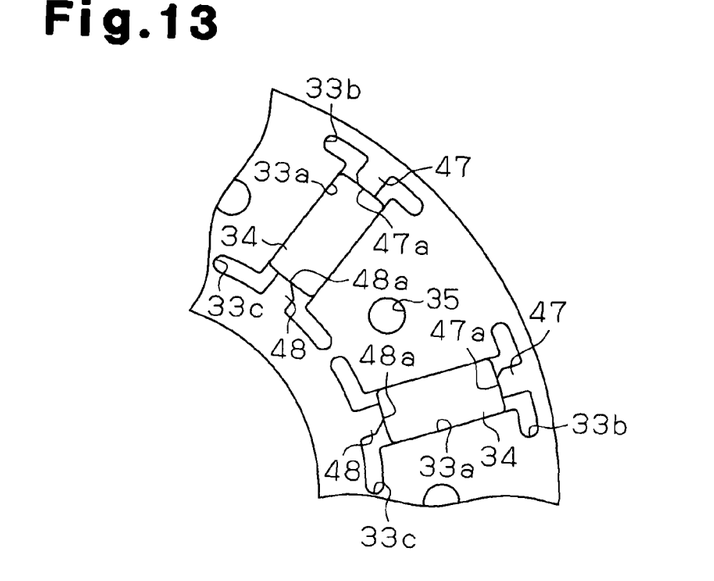
FIG. 13 is a partially enlarged plan view of a rotor in another modification.

As shown in FIG. 13, it is possible to form a chamfer in a distal end 47a of a first radial regulating portion 47, and a chamfer in a distal end 48a of a second radial regulating portion 48 on opposite sides in the circumferential direction. In FIG. 13, the chamfer in the distal end 47a is positioned on a counterclockwise side of the first radial regulating portion 47, and the chamfer in the distal end 48a is positioned on a clockwise side of the second radial regulating portion 48. The dimension in the circumferential direction of the distal end 47a of the first radial regulating portion 47 is formed so as to be equal to or larger than the dimension in the circumferential direction of the distal end 48a of the second radial regulating portion 48. Accordingly, it is easy to increase the rigidity of the first radial regulating portion 47 receiving a centrifugal force of the magnet 34 at a time of rotating the rotor. In other words, it is easy to correspond to a high-speed rotation type embedded magnet type motor in which the centrifugal force may become large.

It is possible to improve the strength of the first radial regulating portions 45 and 47 so as to correspond to the centrifugal force of the magnet 34 by making the dimensions in the circumferential direction of the first radial regulating portions 45 and 47 constant over the radial direction.

The second embodiment and other modifications shown in FIGS. 9 to 13 may be combined with the first embodiment. The radial dimension of the radial regulating portions 8d and 8e shown in FIGS. 1 to 8C may be formed larger than the radial dimension of the circumferential extension portions 8b and 8c.

Figure 3:
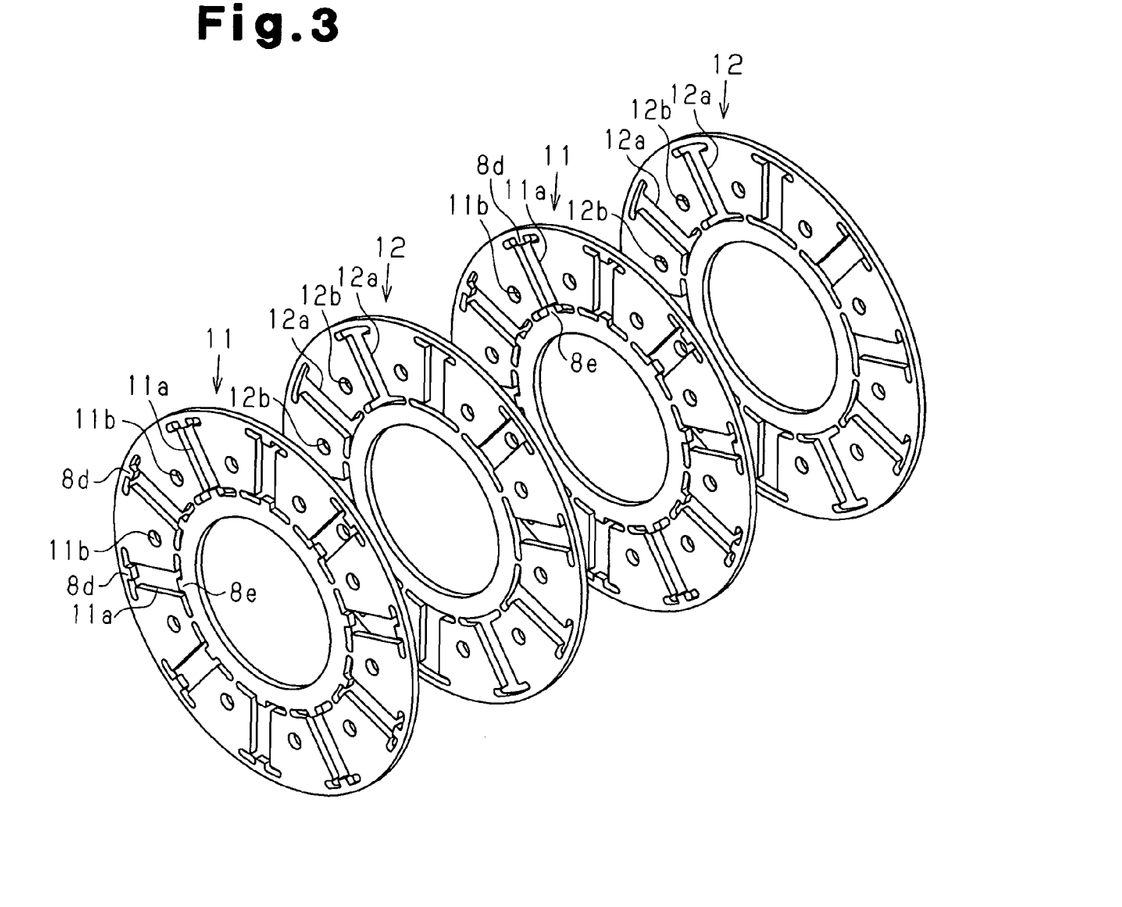
FIG. 3 is an exploded perspective view of the rotor core shown in FIG. 1.

Further, with reference to FIG. 3, the rotor core 33 shown in FIGS. 9 to 13 may be formed by alternately laminating the regulating core sheet 11 having the radial regulating portions 33d and 33e, and the non-regulating core sheet 12 having no radial regulating portions 33d and 33e. In other words, in the second embodiment and the other modifications shown in FIGS. 9 to 13, the cross-sectional area of each of the radial regulating portions 33d and 33e as seen from the radial direction may be formed smaller than the case that each of the radial regulating portions 33d and 33e extends entirely in the axial direction of the rotor core 33.

The amounts by which the center positions X1, X2 of the fastening holes 10 and 35 are displaced radially outward from the radially inner ends of the magnet 9, 34 are not limited to 40% of the radial dimensions H1, H2 of the magnets 9, 34, but may be in a range between 27% and 52%, inclusive. Preferably, the center positions X1, X2 are preferably set such that the displacement amounts are in a range between 36% and 41%, inclusive, of the radial dimensions of the magnets 9, 34.

The circumferential extension portions 8b, 8c, 33b and 33c and the radial regulating portions 8d, 8e, 33d and 33e are not limited to be formed in all the accommodating holes 8a and 33a, but may be formed only in some of the accommodating holes 8a and 33a. Further, the circumferential extension portions 8b and 33b and the radial regulating portions 8d and 33d may be formed only in the radially outer ends of a plurality of accommodating holes 8a and 33a. Inversely, the circumferential extension portions 8b and 33c and the radial regulating portions 8e and 33d may be formed only in the radially inner ends of a plurality of accommodating holes 8a and 33a.

A description will be given below of a third embodiment of the present invention with reference to FIG. 14.

Figures 14, 14A:
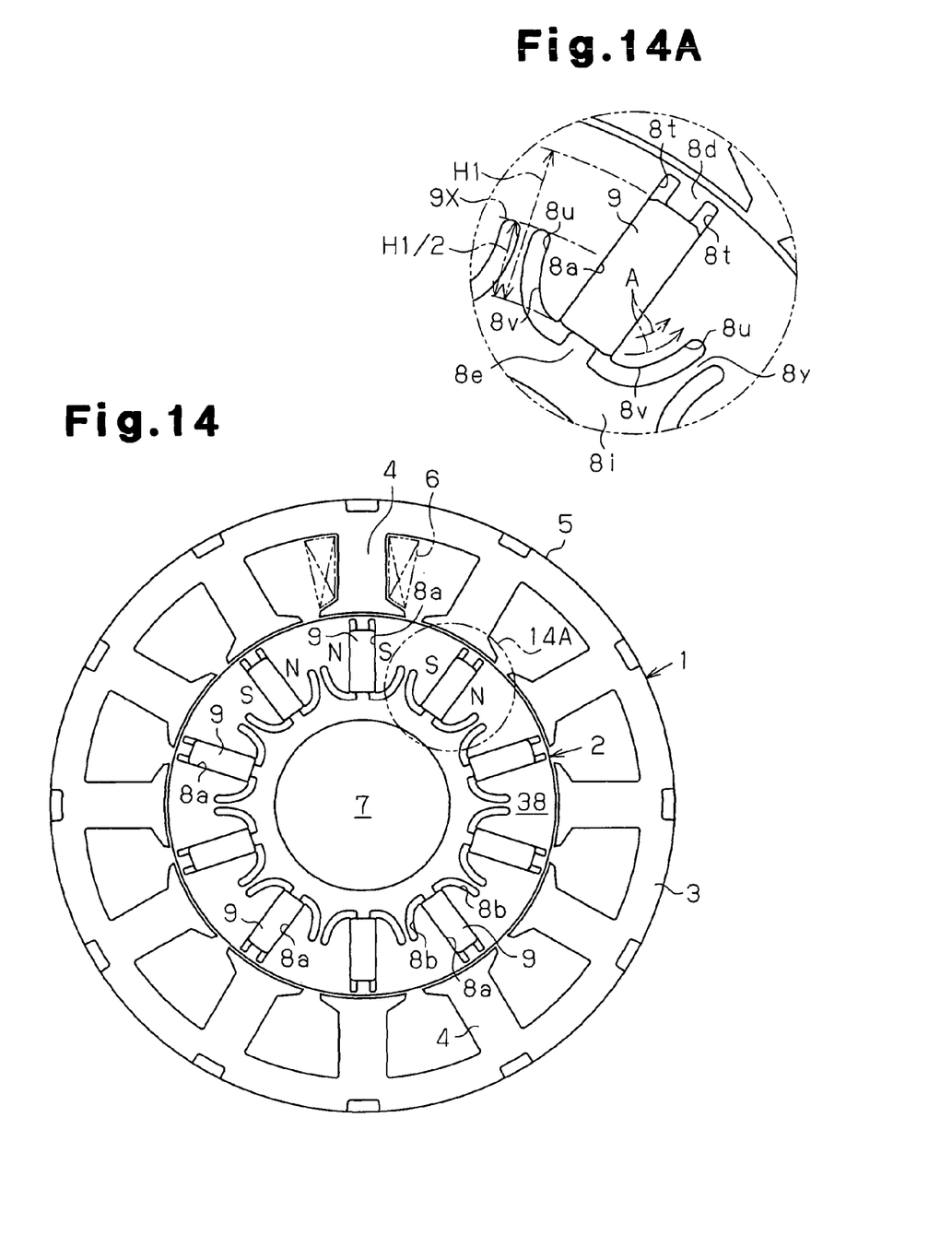
FIG. 14 is a plan cross-sectional view of a motor in a third embodiment of the present invention.
FIG. 14A is a partially enlarged view of the rotor shown in FIG. 14.

As shown in FIG. 14, a rotor core 38 has a pair of first extension spaces 8t holding the first radial regulating portion 8d therebetween, in the radially outer end in each of the accommodating holes 8a. A pair of first extension spaces 8t extend radially outward from both ends in the circumferential direction of the accommodating hole 8a, and reach a portion close to an outer periphery of the rotor core 8. Each of the first extension spaces 8t does not protrude further outward in the circumferential direction with respect to the magnet 9. The dimension in the circumferential direction, that is, the width of each of the first extension space 8m is constant.

The rotor core 38 has a pair of second extension spaces 8u holding the second radial regulating portion 8e therebetween, in the radially inner end in each of the accommodating holes 8a. A pair of second extension spaces 8u serving as a pair of guide extension portions slightly protrude radially inward from both ends in the circumferential direction of the accommodating hole 8a, and thereafter extend in opposite directions. Each of the second extension spaces 8u extends outward in the circumferential direction with respect to the magnet 9, and is further curved so as to extend radially outward. Each of the second extension spaces 8u comes close to an outer periphery of the rotor core 38 in accordance with being away from the magnet 9 in the circumferential direction. A radial position of a radially outer end of the second extension space 8u reaches a radial center 9x of the magnet 9. In other words, the second extension space 8u extends radially outward from the radially inner end of the magnet 9 at a distance H1/2 corresponding to one half of the radial dimension H1 of the magnet 9.

The width of each of the second extension spaces 8u is constant. The rotor core 38 has a plurality of curved surfaces 8v respectively defining the second extension spaces 8u on the radially outer side. The curved surface 8v is curved in such a manner as to be radially outward in accordance with being further away from the magnet 9 in the circumferential direction. The curved surface 8v is curved with respect to the end surface in the circumferential direction of the magnet 9 extending in the radial direction. Each of the curved surfaces 8v exists in an inner wall of the rotor core 38 on a side close to an outer periphery of the rotor core 38 with respect to the corresponding second extension space 8u. The rotor core 38 has a plurality of bridge portions 8y arranged at a uniform interval in the circumferential direction. Each of the bridge portions 8y is defined by a pair of adjacent second extension spaces 8u between a pair of magnets 9 which are adjacent to each other in the circumferential direction. The dimension in the circumferential direction of each of the bridge portions 8y is reduced toward the outer end in the radial direction from the inner end in the radial direction.

The third embodiment mentioned above has the following advantages.

(7) In the rotor core 38, each of the second extension spaces 8u extends outward in the circumferential direction with respect to the magnet 9 from the radially inner end of the corresponding accommodating hole 8a, and extends further radially outward than the radially inner end of the magnet 9. Accordingly, a magnet path of the leakage flux becomes long in the periphery of the radially inner end of the magnet 9. An arrow in FIG. 14A indicates a magnetic flux A around the radially inner end of the magnet 9. The second extension space 8u guides the magnetic flux A output from the radially inner end of the magnet 9 radially outward. Accordingly, it is possible to reduce the magnetic flux directly directed to the S pole of the magnet 9 from the N pole on the radially inner side of the magnet 9. An effective magnetic flux in the rotor core 38 is increased. As a result, it is possible to improve the motor efficiency.

(8) The curved surface 8v defines the second extension space 8u on the radially outer side. The curved surface 8v is curved so as to be further radially outward in accordance with being away from the magnet 9 in the circumferential direction. Accordingly, the second extension space 8u smoothly guides the magnetic flux A output from the radially inner end of the magnet 9 radially outward.

(9) The second extension space 8u extends to the radial center 9x from the radially inner end of the magnet 9. Accordingly, it is easy to prevent the magnetic flux A in the periphery of the radially inner end of the magnet 9 from directly leaking to the S pole from the N pole. Describing in detail, in the case that the second extension space 8u is not provided, the magnetic flux output from the N pole tends to directly approach the S pole via the radially inner side of the magnet 9. The second extension space 8u in accordance with the present embodiment suppresses the leakage flux mentioned above.

(10) A pair of first extension spaces 8t extend radially outward from both ends in the circumferential direction in the radially outer end of each of the accommodating holes 8a, and reach the portion close to the outer circumference of the rotor core 8. Accordingly, it is possible to reduce the leakage flux in the periphery of the radially outer end of the magnet 9. As a result, the effective flux in the rotor core 38 is increased.

The third embodiment mentioned above may be modified as follows.

As long as each of the second extension spaces 8u extends outward in the circumferential direction with respect to the magnet 9 from the radially inner end of the accommodating hole 8a, and extends further radially outward than the radially inner end of the magnet 9, the shape of the second extension space 8u may be modified.

Figure 15:
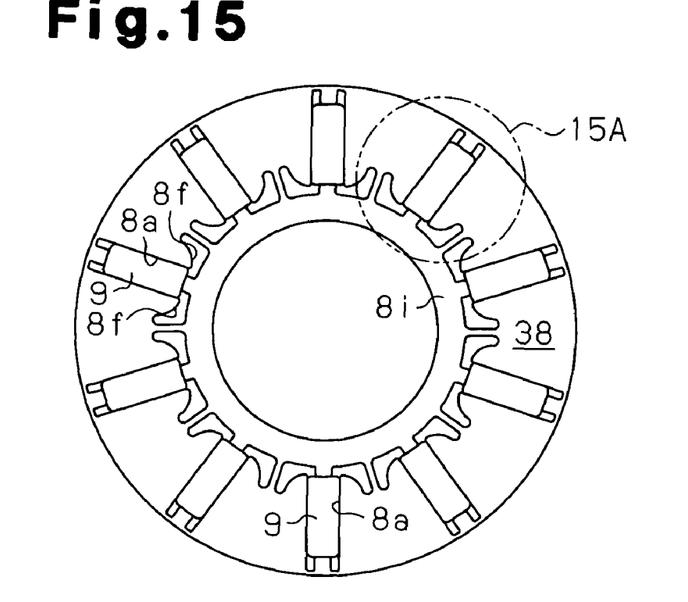
FIG. 15 is a plan cross-sectional view of a rotor in another modification.
Figure 15A:
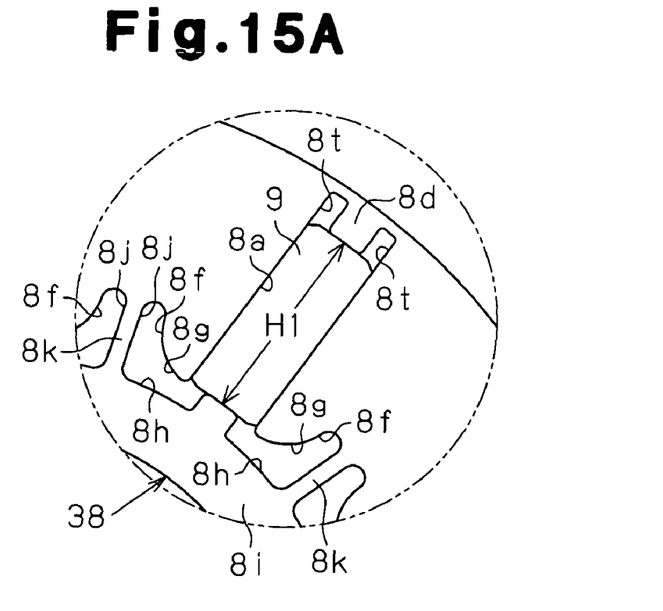
FIG. 15A is a partially enlarged view of the rotor shown in FIG. 15.

As shown in FIG. 15, a curved surface 8g with respect to a second extension space 8f may be made shorter than the curved surface 8v in FIG. 14. The radial dimension of the second extension space 8u in FIG. 14 is constant. However, the radial dimension of the second extension space 8f in FIG. 15 is increased in accordance with moving away from the magnet 9 in the circumferential direction. The second extension space 8f has a shape obtained by projecting the curved space of the second extension space 8u in FIG. 14 in a radially inward direction. A radially inner wall surface 8h of the second extension space 8f has a constant distance from the inner circumferential surface of the rotor core 38. In other words, the wall surface 8h is a surface having a constant radial position. On the assumption that a portion of the rotor core 38 held between the inner circumferential surface of the rotor core 38 and the second extension space 8f is called as an inner annular portion 8i, the radial dimension of the inner annular portion 8i is constant over the circumferential direction.

As mentioned above, in the second extension space 8f in FIG. 15, the radial dimension of the second extension space 8f can be enlarged even if a radially inward protruding amount is the same as the second extension space 8u in FIG. 4, and it is possible to extend the magnetic path of the leakage flux further. In other words, in the second extension space 8f in FIG. 15, it is possible to make the radial dimension of the second extension space 8f larger than the case in FIG. 14 while keeping the radial dimension of the inner annular portion 8i constant over the circumferential direction. Accordingly, it is possible to further reduce the leakage flux and further increase the effective magnetic flux while keeping the rigidity of the rotor core 8.

In the case of FIG. 15, the dimension in the circumferential direction of a bridge portion 8k held by a pair of second extension spaces 8f positioned between a pair of accommodating holes 8a which are adjacent to each other in the circumferential direction is constant over the radial direction. The bridge portion 8k serves as a magnetic path of the leakage flux. In the case of FIG. 15, it is possible to make the width of the magnetic path of the leakage flux extending in the radial direction constant as seen from the axial direction. Accordingly, it is possible to easily decrease the width of the bridge portion 8k. This further reduces the leakage flux and further increases the effective magnetic flux.

The bridge portion 8k is held between a pair of parallel surfaces 8j which extend in the radial direction and are in parallel to each other. A pair of parallel surfaces 8j exist in the inner wall of a pair of second extension spaces 8f which are adjacent so as to face each other in the circumferential direction.

The second extension space 8f shown in FIG. 15 extends radially outward from the radially inner end of the magnet 9 by a distance about one quarter (H1/4) of the radial dimension H1 of the magnet 9. In this case, the fastening holes 10 are easily arranged by referring to a graph in FIG. 5.

The second extension spaces 8u and 8f mentioned above are not limited to be curved, but may be formed so as to be bent vertically. In other words, the second extension spaces 8u and 8f and the curved surfaces 8v and 8g may be formed so as to first extend outward in the circumferential direction from the magnet 9, be bent substantially vertically, and extend radially outward.

The first extension space 8t positioned in the radially outer end of the accommodating hole 8a may be formed so as to extend in the circumferential direction. In this case, the first extension space 8t may be deleted.

The structure is not limited to form the rotor core 8 by laminating the regulating core sheet 11 and the non-regulating core sheet 12. However, the rotor core 8 may be formed, for example, by sintering a magnetic pulverulent body.

The number of the teeth 4, the numbers of the accommodating holes 8a and 33a and the numbers of the magnets 9 and 34 may be respectively modified.

What is claimed is:

1. An embedded magnet type rotating electric machine comprising a rotor, the rotor defining an axial direction and a circumferential direction, wherein the rotor includes: a rotor core defining a plurality of accommodating holes lined up in the circumferential direction, each of the accommodating holes passing through the rotor core in the axial direction, and each of the accommodating holes extending in the radial direction; and a plurality of magnets that are respectively arranged in the accommodating holes;

wherein the rotor core includes:

a plurality of core sheets laminated in the axial direction, the core sheets including a plurality of regulating core sheets each having a core-sheet radial regulating portion, and a plurality of non-regulating core sheets each having a space in a portion corresponding to the core-sheet radial regulating portion, the regulating core sheets alternating with the non-regulating core sheets in the axial direction;

an extension portion in the circumferential direction extending further outward in the circumferential direction with respect to the magnet from at least one of a radially outer end and a radially inner end in the accommodating hole; and a radial regulating portion comprising the core sheet radial regulating portions of the plurality of the regulating core sheets, the radial regulating portion regulating a movement of the magnet in a radial direction, the radial regulating portion extending in the radial direction in such a manner as to correspond to a center in the circumferential direction of the accommodating hole, the radial regulating portion contacting only a circumferential center portion of a radial end of the magnet, and wherein a dimension in the circumferential direction of a portion of the radial regulating portion that is brought into contact with the magnet being smaller than a dimension in the circumferential direction of the magnet.

2. The rotating electric machine according to claim 1, wherein the regulating core sheets and the non-regulating core sheets alternate one by one or plural by plural.

3. The rotating electric machine according to claim 1, wherein each of the core sheets has a plurality of pre-lamination accommodating holes for forming the accommodating holes, and the core sheets include outer regulating core sheets having the radial regulating portion only in a radially outer end of the pre-lamination accommodating hole, and inner regulating core sheets having the radial regulating portion only in a radially inner end of the pre-lamination accommodating hole.

4. The rotating electric machine according to claim 3, wherein the outer regulating core sheets and the inner regulating core sheets are laminated alternately one by one or plural by plural.

5. The rotating electric machine according to claim 1, wherein the rotor core includes a plurality of core sheets laminated in the axial direction, each of the core sheets has a plurality of pre-lamination accommodating holes for forming the accommodating holes, the core sheets include a partly regulating core sheet having at least one said pre-lamination accommodating hole in which the radial regulating portion is arranged, and at least one said pre-lamination accommodating hole having a space in a portion corresponding to the radial regulating portion, and the core sheets are laminated in such a manner that the rotor core has the radial regulating portion in a part of the accommodating hole with respect to the axial direction.

6. A rotating electric machine according to claim 5, wherein the partly regulating core sheets are laminated in such a manner as to be shifted in the circumferential direction one by one or plural by plural.

7. The rotating electric machine according to claim 1, wherein the rotor core includes a plurality of core sheets laminated in the axial direction, each of the core sheets has a plurality of pre-lamination accommodating holes for forming the accommodating holes, the core sheets include thin regulating core sheets, each of the thin regulating core sheets has a sheet main body and the radial regulating portion extending from the sheet main body, and the radial regulating portion is thinner than the sheet main body.

8. The rotating electric machine according to claim 1, wherein a radial dimension of the radial regulating portion is larger than a radial dimension of the circumferential extension portion.

9. The rotating electric machine according to claim 1, wherein the radial regulating portion has a distal end which is brought into contact with the magnet, and a proximal end which is on an opposite side to the distal end with respect to the radial direction, and a dimension in the circumferential direction of the distal end in at least one said radial regulating portion is smaller than a dimension in the circumferential direction of the proximal end.

10. The rotating electric machine according to claim 1, wherein the radial regulating portion is one of a first radial regulating portion positioned in a radially outer end of the accommodating hole, and a second radial regulating portion positioned in a radially inner end of the accommodating hole, and a dimension in the circumferential direction of a portion of the first radial regulating portion that is brought into contact with the magnet is equal to or larger than a dimension in the circumferential direction of a portion of the second radial regulating portion that is brought into contact with the magnet.

11. The rotating electric machine according to claim 9, wherein the radial regulating portion is one of a plurality of radial regulating portions, and a visible outline of a portion facing the magnet in at least one radial regulating portion is formed in a curved shape as seen from the axial direction.

12. The rotating electric machine according to claim 11, wherein the curved portion is brought into contact with the magnet at a plurality of points as seen from the axial direction.

13. The rotating electric machine according to claim 1, wherein each of the core sheets has a plurality of pre-lamination accommodating holes for forming the accommodating holes, and a plurality of pre-lamination fastening holes, the pre-lamination accommodating holes and the pre-lamination fastening holes are lined up alternately in the circumferential direction, and a plurality of the core sheets are laminated, whereby a plurality of the pre-lamination fastening holes aligned in the axial direction form a fastening hole, and a plurality of the core sheets are fastened by a fastening member inserted to the fastening hole, and wherein a center position of the fastening hole as seen from the axial direction is displaced radially outward from the radially inner end of the magnet by an amount in a range between 27% and 52%, inclusive, of the radial dimension of the magnet.

14. The rotating electric machine according to claim 13, wherein the center position of the fastening hole as seen from the axial direction is displaced radially outward from the radially inner end of the magnet by an amount in a range between 36% and 41%, inclusive, of the radial dimension of the magnet.

15. The rotating electric machine according to claim 1, wherein the rotor core has a guide extension portion extending further outward in the circumferential direction with respect to the magnet from the radially inner end in each of the accommodating holes, and the guide extension portion extends further radially outward than the radially inner end of the magnet.

16. The rotating electric machine according to claim 15, wherein the rotor core has an inner wall positioned on the radially outer side so as to define the guide extension portion, the inner wall has a curved surface curved with respect to an end surface in the circumferential direction of the magnet, and the curved surface is further radially outward in accordance with being further circumferentially outward.

17. The rotating electric machine according to claim 16, wherein a radial dimension of the guide extension portion is increased in accordance with being away from the magnet in the circumferential direction.

18. The rotating electric machine according to claim 17, wherein the guide extension portion is one of a pair of guide extension portions which are adjacent to each other in the circumferential direction in each of the accommodating holes, and a pair of guide extension portions are defined by a pair of parallel surfaces that face each other in the circumferential direction so as to be adjacent to each other.

19. The rotating electric machine according to claim 15, wherein a radial position of a radially outer end of the guide extension portion is equal to a radial center of the magnet.

* * * * *